United States Patent Office 3,041,093
Patented June 26, 1962

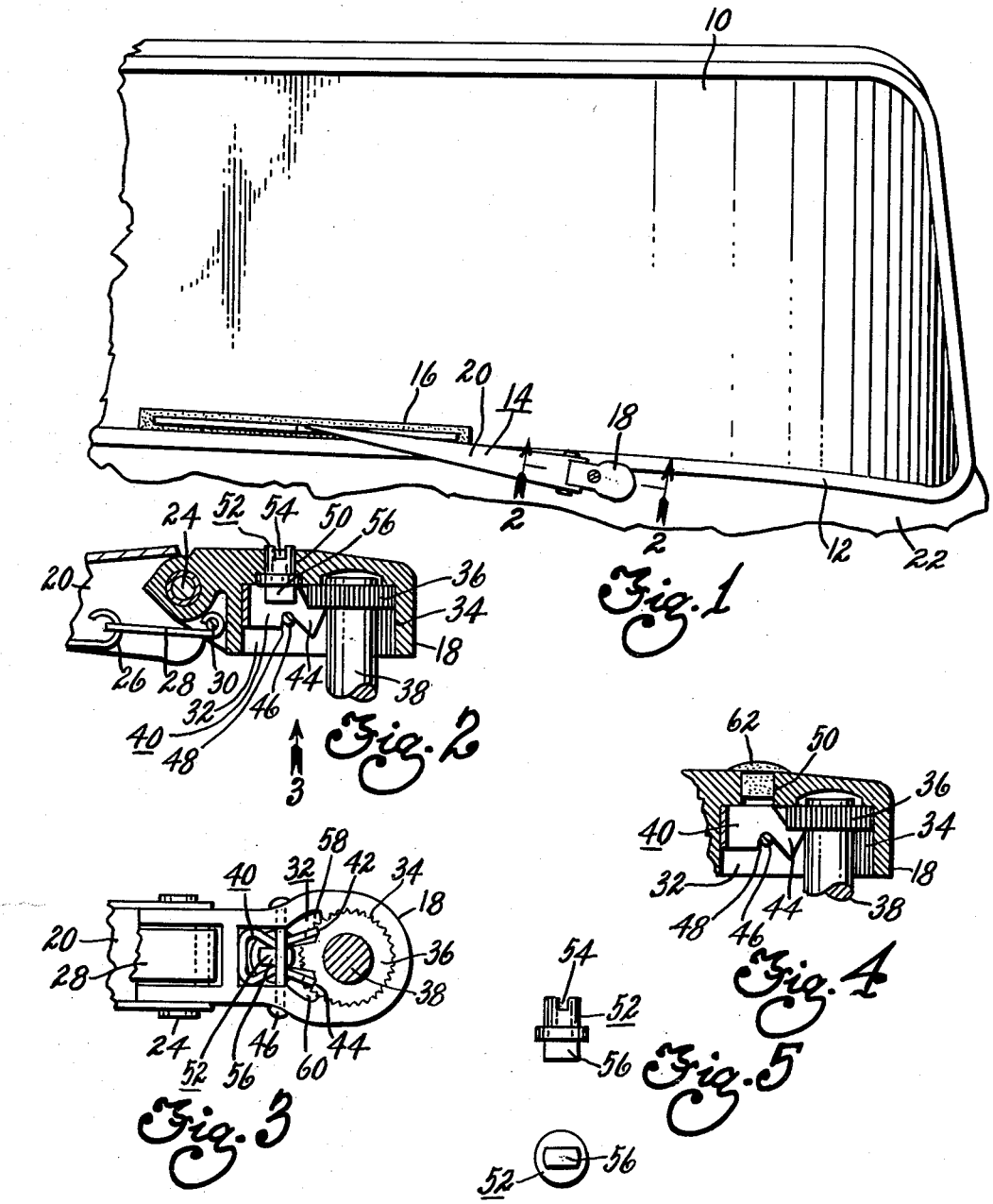

3,041,093
WINDSHIELD WIPER ARM ATTACHMENT
Charles P. Bonfiglio, Rochester, N.Y., assignor to General Motors Corporation, Detroit, Mich., a corporation of Delaware
Filed Jan. 8, 1960, Ser. No. 1,296
4 Claims. (Cl. 287—53)

This invention pertains to windshield wipers, and particularly to improved means for securing a wiper arm to a wiper shaft.

The majority of windshield wiper arms include a die cast socket section having a knurled recess therein adapted to receive a complementary knurled driver, or burr, attached to the outer end of a wiper shaft. The burr is of greater diameter than the shaft, and the socket section of the wiper arm may be provided with a device for locking the arm to the shaft to prevent axial separation of the arm from the shaft during wiper operation. The present invention relates to improved locking means for a wiper arm and shaft attachment of the foregoing type. Accordingly, among my objects are the provision of a wiper arm having an inner section with a socket recess including means for locking the wiper arm to a drive burr so as to prevent axial movement therebetween; and the further provision of a locking device for a wiper arm of the foregoing type including a leaf spring lock; and the still further provision of a leaf spring lock for a wiper arm including cam means for releasing the same.

The foregoing and other objects are accomplished in the present invention by locating the locking spring in a recess adjacent to the socket recess with the ends of the locking spring being engageable with the lower surface of the drive burr. Specifically, the wiper arm includes spring hinge connected inner and outer sections, the inner section comprising a die casting having an elongated recess therein, part of which is cylindrical. The cylindrical part of the recess is axially serrated, and is adapted to receive a complementary serrated burr attached to the outer end of a wiper shaft. In both of the disclosed embodiments, the locking spring is generally U-shaped, with the free ends inherently biased towards each other and extending into the cylindrical socket recess. The spring is held in assembled relation with the inner arm section by a transversely extending pin which is received in notches in the legs of the leaf spring.

In one embodiment the inner arm section rotatably supports a pin having a screw driver slot in the outer end thereof accessible from the exterior of the wiper arm. The pin has an eccentric portion disposed between the legs of the leaf spring, so that when it is rotated, the eccentric portion will spread the legs of the leaf spring thereby releasing the lock and permitting withdrawal of the wiper arm from the wiper shaft.

In a second embodiment the wiper arm is merely formed with the opening adapted to be closed by a plug. In order to release the lock, the plug is removed by such means as a screw driver and the legs of the locking spring are spread apart by inserting the tool through the opening to release the lock.

Further objects and advantages of the present invention will be apparent from the following description, reference being had to the accompanying drawing, wherein preferred embodiments of the present invention are clearly shown.

In the drawing:

FIGURE 1 is a fragmentary view of a portion of a vehicle having a wiper arm with the improved locking means of the present invention.

FIGURE 2 is an enlarged, fragmentary view, partly in section and partly in elevation, taken along line 2—2 of FIGURE 1.

FIGURE 3 is a view taken in the direction of arrow 3 of FIGURE 2.

FIGURE 4 is a fragmentary, sectional view of a modified arm structure.

FIGURES 5 and 6 are, respectively, side and bottom elevation views of the eccentric.

With particular reference to FIGURE 1, a portion of a vehicle is shown including a windshield 10 having a reveal molding 12 and adapted to be cleaned by a windshield wiper organization comprising an arm 14 and a wiper blade 16. The arm 14 comprises spring hinge connected inner and outer sections 18 and 20, the inner section 18 being drivingly connected to a pivot shaft which projects through an opening in the vehicle cowl 22.

With reference to FIGURES 2 and 3, in one embodiment the die cast inner arm section 18 is connected by a transversely extending hinge pin 24 to the outer section 20. One end of a pressure applying spring 26 is attached to a retainer 28 pivoted at 30 to the inner arm section 18. The other end of the spring 26, not shown, is suitably connected to the outer arm section 20 and biases the outer arm section 20 in the counterclockwise direction about the hinge pin 24 as seen in FIGURE 2.

The inner arm section 18 is formed with an elongate 32 that interconnects with a cylindrical recess 34 which is axially serrated. The recess portion 34 is adapted to receive an axially serrated driver, or burr, 36 attached to the outer end of the pivot shaft 38. As is conventional, the diameter of the burr 36 is greater than the diameter of the pivot shaft 38. The mating serrated socket portion 34 and the serrated burr 36 when engaged, drivingly connect the arm 14 for oscillation with the shaft 38.

In order to prevent axial separation of the inner arm section 18 from the burr 36, the present invention contemplates the use of a leaf spring locking device generally indicated by the numeral 40. The leaf spring 40 is disposed within the recess 32 and has a pair of diverging legs 42 and 44 extending into the cylindrical socket recess portion 34. Stated another way, the socket recess 34 may be said to have a side wall opening through which the legs 42 and 44 of the spring extend. The leaf spring 40 is held in assembled relation with the inner arm section 18 by a transversely extending pin 46 which engages notches 48 in the legs 42 and 44 of the leaf spring 40. The legs 42 and 44 of the leaf spring are inherently biased towards each other and in this position the ends are disposed beneath the lower edge of the burr 36 as shown in FIGURES 2 and 3. In this manner, the locking spring 40 prevents axial separation of the inner arm section 18 and the wiper shaft 38.

In order to facilitate removal of the wiper arm from the shaft 38, the inner arm section 18 is formed with an opening 50 within which a pin 52 is journalled. The pin 52 has a screw driver slot 54 in the outer end thereof, and the eccentric end 56 is disposed between the legs 42 and 44 of the leaf spring 40. Upon angular movement of the pin 52 throughout 90°, the eccentric portion 56 will spread the legs 42 and 44 into the cavities 58 and 60, respectively, of the recess thereby enabling the inner arm section 18 to be removed from the wiper shaft 38.

With reference to FIGURE 4, in a modified embodiment, wherein similar numerals depict similar parts, as described hereinbefore, the opening 50 in the inner arm section 18 is adapted to be closed by a removable plug 62. When the plug 62 is removed, the legs 42 and 44 of the locking spring 40 can be spread apart by inserting a suitable tool, such as a screw driver, into the opening 50 to facilitate removal of the socket section 18. When the arm is reassembled with the wiper shaft, the tool is removed from the opening 50 thereby allowing the legs of the leaf spring 42 and 44 to move into the cylindrical portion 34 of the recess and engage the lower surface of the burr 36. Thereafter, the plug 62 can be replaced.

While the embodiments of the invention as herein disclosed constitute preferred forms, it is to be understood that other forms might be adopted.

What is claimed is as follows:

1. In a windshield wiper organization, an actuating shaft having an enlarged drive burr at the outer end thereof, a wiper arm having an inner section with a socket recess having an opening in one of its side walls and adapted to receive said burr, and a leaf spring having diverging legs extending through said opening and into the socket recess for engaging the drive burr to prevent removal of the arm from the shaft.

2. In a windshield wiper organization, an actuating shaft having an enlarged drive burr at the outer end thereof, a wiper arm having an inner section with a socket recess having an opening in one of its side walls and adapted to receive said burr, a leaf spring having diverging legs extending through said opening and into the socket recess for engaging the drive burr to prevent removal of the arm from the shaft, and external means engageable with said leaf spring for spreading said legs to permit removal of the arm from said shaft.

3. A windshield wiper arm including, an inner section having an elongate recess interconnected with a cylindrical recess, a leaf spring disposed within said elongate recess and having legs extendible into the cylindrical recess, the legs of said leaf spring being notched, and means for retaining said leaf spring within said elongate recess comprising a transversely extending pin having portions disposed within the notches of the legs of said leaf spring.

4. A windshield wiper arm including, an inner section having an elongate recess interconnected with a cylindrical recess, a leaf spring disposed within said elongate recess and having legs extendible into the cylindrical recess, means for retaining said leaf spring within said elongate recess, said inner arm section having a tool receiving opening communicating with said elongate recess, and a plug insertable into said opening for normally closing the same.

References Cited in the file of this patent

UNITED STATES PATENTS

| | | |
|---|---|---|
| 490,709 | Froehlich | Jan. 31, 1893 |
| 1,853,025 | Anderson | Apr. 12, 1932 |
| 2,417,991 | Nesson | Mar. 25, 1947 |
| 2,420,060 | Adams | May 6, 1947 |
| 2,507,511 | Friedag et al. | May 16, 1950 |
| 2,688,173 | Van Peet | Sept. 7, 1954 |
| 2,896,287 | Stultz | July 28, 1959 |